United States Patent
Zhou et al.

(10) Patent No.: US 10,271,353 B2
(45) Date of Patent: Apr. 23, 2019

(54) METHODS AND APPARATUS FOR SELECTING ENHANCED DISTRIBUTED CHANNEL ACCESS PARAMETERS FOR DIFFERENT STATIONS

(71) Applicant: QUALCOMM Incorporated, San Diego, CA (US)

(72) Inventors: Yan Zhou, San Diego, CA (US); Simone Merlin, San Diego, CA (US); Gwendolyn Denise Barriac, Encinitas, CA (US); Alfred Asterjadhi, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 15/405,218

(22) Filed: Jan. 12, 2017

(65) Prior Publication Data

US 2017/0202017 A1    Jul. 13, 2017

Related U.S. Application Data

(60) Provisional application No. 62/278,268, filed on Jan. 13, 2016.

(51) Int. Cl.
*H04W 24/10* (2009.01)
*H04W 74/08* (2009.01)
(Continued)

(52) U.S. Cl.
CPC .......... *H04W 74/08* (2013.01); *H04B 7/0452* (2013.01); *H04W 24/10* (2013.01);
(Continued)

(58) Field of Classification Search
None
See application file for complete search history.

(56) References Cited

U.S. PATENT DOCUMENTS

| 9,699,741 | B1 | 7/2017 | Chu et al. |
| 2007/0155365 | A1* | 7/2007 | Kim ........................ H04L 65/80 |
| | | | 455/410 |

(Continued)

FOREIGN PATENT DOCUMENTS

WO    WO-2015194727 A1    12/2015

OTHER PUBLICATIONS

International Search Report and Written Opinion—PCT/US2017/013451—ISA/EPO—dated Apr. 26, 2017.
(Continued)

*Primary Examiner* — Brian S Roberts
(74) *Attorney, Agent, or Firm* — Knobbe, Martens, Olson & Bear, LLP

(57) ABSTRACT

In some aspects, a method for configuring channel access parameters in a wireless communication system includes determining, at an access point, an enhanced distributed channel access (EDCA) parameter for a first subset of stations of a plurality of stations, the first subset of stations capable of transmitting multi-user uplink transmissions. The method further includes generating an information element including the EDCA parameter. The method further includes transmitting the information element such that the information element is decodable by the first subset of stations and not by a second subset of stations of the plurality of stations.

17 Claims, 4 Drawing Sheets

(51) Int. Cl.
*H04W 72/12* (2009.01)
*H04B 7/0452* (2017.01)
*H04W 72/04* (2009.01)
*H04W 74/00* (2009.01)
*H04W 88/08* (2009.01)

(52) U.S. Cl.
CPC ....... *H04W 72/0413* (2013.01); *H04W 72/12* (2013.01); *H04W 72/121* (2013.01); *H04W 74/002* (2013.01); *H04W 74/006* (2013.01); *H04W 74/0816* (2013.01); *H04W 88/08* (2013.01)

(56) References Cited

U.S. PATENT DOCUMENTS

| | | | |
|---|---|---|---|
| 2011/0268054 A1* | 11/2011 | Abraham | H04W 74/06 370/329 |
| 2013/0010664 A1 | 1/2013 | Kang et al. | |
| 2014/0119288 A1* | 5/2014 | Zhu | H04W 72/0406 370/329 |
| 2015/0063111 A1 | 3/2015 | Merlin et al. | |
| 2015/0146654 A1* | 5/2015 | Chu | H04W 72/1289 370/329 |
| 2015/0237654 A1 | 8/2015 | Park et al. | |
| 2016/0165637 A1 | 6/2016 | Kim et al. | |
| 2017/0202023 A1 | 7/2017 | Zhou et al. | |

OTHER PUBLICATIONS

Rison M., "LB187 (D2.0) Resolution for Beamforming Report Segmentation: 11-12-0587-02-00ac-lb187-d2-0-resolution-for-beamforming-report-segmentation", IEEE DRAFT, 11-12-0587-02-00AC-LB187-D2-0-Resolution-For-Beamforming-Report-Segmentation, IEEE—SA MENTOR, Piscataway, NJ USA, vol. 802.11ac, No. 2, May 16, 2012 (May 16, 2012), XP017671928, pp. 1-101. [retrieved on May 16, 2012].

Uwai T. et al., "UL-MU MAC Throughput Under Non-Full Buffer Traffic, 11-15-0376-01-00ax-ul-mu-mac-throughput-under-non-full-buffer-traffic", IEEE DRAFT, 11-15-0376-01-00AX-UL-MU-MAC-Throughput-Under-Non-Full-Buffer-Traffic, IEEE-SA, Mentor, Piscataway, NJ USA, vol. 802.11ax, No. 1, Mar. 10, 2015 (Mar. 10, 2015) XP068083039, pp. 1-16. [retrieved on Mar. 10, 2015].

* cited by examiner

METHODS AND APPARATUS FOR SELECTING ENHANCED DISTRIBUTED CHANNEL ACCESS PARAMETERS FOR DIFFERENT STATIONS

CROSS REFERENCE TO RELATED APPLICATIONS

This application claims priority to U.S. Provisional Application No. 62/278,268, filed Jan. 13, 2016, and entitled "METHODS AND APPARATUS FOR SELECTING ENHANCED DISTRIBUTED CHANNEL ACCESS PARAMETERS FOR DIFFERENT STATIONS." The content of this prior application is considered part of this application, and is hereby incorporated by reference in its entirety.

BACKGROUND

Field

The present application relates generally to wireless communications, and more specifically to methods and apparatuses for selecting enhanced distributed channel access (EDCA) parameters for multi-user (MU) transmissions.

Background

Communications networks are used to exchange messages among devices. Wireless networks are often preferred when the network elements are mobile and thus have dynamic connectivity needs, or if the network architecture is formed in an ad hoc, rather than fixed, topology. The devices in a wireless network may transmit/receive information based on channel access protocols such as enhanced distributed channel access (EDCA). EDCA defines separate data traffic access categories, which may include best effort, background, video and voice over wireless local access network (WLAN) (VoWLAN). For example, data traffic associated with transmission or reception of emails may be assigned a low priority class, and VoWLAN may be assigned a high priority class. Utilizing EDCA, high-priority data traffic has more opportunity of being sent than a low-priority data traffic because a station with high priority data traffic waits for less time before sending such a data packet, on average, than a station with low priority data traffic.

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks advantageously facilitate user mobility and rapid field deployment when compared to fixed wired networks.

In order to address the issue of increasing bandwidth requirements that are demanded for wireless communications systems, different schemes are being developed to allow multiple user terminals (UTs) to communicate with a single access point by sharing the channel resources while achieving high data throughputs. With limited communication resources, it is desirable to reduce the amount of traffic passing between the access point and the multiple terminals. For example, when multiple terminals send uplink communications to the access point, it is desirable to minimize the amount of traffic to complete the uplink of all transmissions. Thus, there is a need for an improved protocol for uplink transmissions from multiple terminals.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

One aspect of the disclosure provides a method for selecting channel access parameters for communication in a network, the method comprising selecting, at a first wireless device, an enhanced distributed channel access (EDCA) parameter for communication with a second wireless device, wherein selecting the EDCA parameter is based on a capability of the first wireless device to receive scheduled uplink transmissions, and a capability of the second wireless device to transmit multi-user uplink transmissions.

For some embodiments, the method may include transmitting an indication of the selection of the EDCA parameter to the second wireless device. For some embodiments, the first wireless device is one of an access point and a station, and the second wireless device is the other one of the access point and the station. For some embodiments, selecting the EDCA parameter is based on a previous transmission from the second wireless device to the first wireless device. For some embodiments, selecting the EDCA parameter is based on receiving an immediate response to the indication transmitted to the second wireless device. For some embodiments, selecting a second EDCA parameter for communication with the second wireless device is based on a time elapsed since receiving an immediate response to the indication transmitted to the second wireless device. For some embodiments, the method may include generating an information element, the information element comprising a variable length of bits, wherein the variable length of bits is based on at least one of a type of signal and a service provider. For some embodiments, selecting the EDCA parameter further comprises selecting the EDCA parameter based on a type of the second wireless device. For some embodiments, the method may include classifying the second wireless device into a subset of wireless devices, the subset of wireless devices being one of a plurality of subsets of wireless devices, wherein the classification is based on a type of the second wireless device and a multi-user uplink capability of the second wireless device. For some embodiments, the method may include selecting, at the first wireless device, the EDCA parameter for communication with the second wireless device based on the subset of wireless devices. For some embodiments, the EDCA parameter comprises at least one of a minimum contention window (CWmin), a maximum contention window (CWmax), a transmit opportunity (TXOP), a transmission opportunity limit (TXOP limit), and an arbitration inter frame space (AIFS). For some embodiments, the first wireless device appends one or more rules for the first wireless device to the EDCA parameter. For some embodiments, the second wireless device is triggered by the first wireless device via the multi-user uplink transmissions to send a single-user uplink transmission. For some embodiments, the second wireless device operates in at least one of a non-high throughput mode and a very high throughput mode. For some embodiments, the method may include advertising, by the first wireless device, the EDCA parameter via an information element, wherein the information element includes at least one of an element identification field, a length field, another information field, and an extension field.

Another aspect of the disclosure is an apparatus for wireless communication, comprising a processing system configured to select, at a first wireless device, an enhanced distributed channel access (EDCA) parameter for communication with a second wireless device, wherein selecting the EDCA parameter is based on a capability of the first wireless device to receive scheduled uplink transmissions uplink transmissions, and a capability of the second wireless device to transmit multi-user uplink transmissions.

For some embodiments, the apparatus may include a transmitter configured to transmit an indication of the selection of the EDCA parameter to the second wireless device. In some embodiments, wherein the processing system is further configured to select the EDCA parameter based on a capability of the first wireless device to receive scheduled uplink transmissions uplink transmissions and a capability of the second wireless device to transmit multi-user uplink transmissions. In some embodiments, selecting the EDCA parameter further comprises selecting the EDCA parameter based on a type of the second wireless device. In some embodiments, the processing system is further configured to classify the second wireless device into a subset of wireless devices, the subset of wireless devices being one of a plurality of subsets of wireless devices, wherein the classification is based on a type of the second wireless device and a multi-user uplink capability of the second wireless device. In some embodiments, the EDCA parameter is selected based on the subset of wireless devices. In some embodiments, the EDCA parameter comprises at least one of a minimum contention window (CWmin), a maximum contention window (CWmax), a transmit opportunity (TXOP), a transmission opportunity limit (TXOP limit), and an arbitration inter frame space (AIFS). In some embodiments, the first wireless device appends one or more rules for the first wireless device to the EDCA parameter. In some embodiments, the second wireless device is triggered by the first wireless device via the multi-user uplink transmissions to send a single-user uplink transmission. In some embodiments, the second wireless device operates in at least one of a non-high throughput mode and a very high throughput mode. In some embodiments, the processor system may advertise, by the first wireless device, the EDCA parameter via an information element, wherein the information element includes at least one of an element identification field, a length field, another information field, and an extension field.

Another aspect of the disclosure is a non-transitory computer-readable medium comprising code that, when executed, causes an apparatus to select, at a first wireless device, an enhanced distributed channel access (EDCA) parameter for communication with a second wireless device, wherein selecting the EDCA parameter is based on a capability of the first wireless device to receive scheduled uplink transmissions, and a capability of the second wireless device to transmit multi-user uplink transmissions.

For some embodiments, the non-transitory computer-readable medium comprising code that, when executed, causes an apparatus to select, at a first wireless device, an enhanced distributed channel access (EDCA) parameter for communication with a second wireless device, wherein selecting the EDCA parameter is based on a capability of the first wireless device to receive scheduled uplink transmissions, and a capability of the second wireless device to transmit multi-user uplink transmissions. For some embodiments, the non-transitory computer-readable medium comprising code that, when executed, causes the apparatus to advertise, by the first wireless device, the EDCA parameter via an information element, wherein the information element includes at least one of an element identification field, a length field, another information field, and an extension field. For some embodiments, the non-transitory computer-readable medium comprising code that, when executed, causes the apparatus to transmit an indication of the selection of the EDCA parameter to the second wireless device. For some embodiments, the non-transitory computer-readable medium comprising code that, when executed, causes the apparatus to classify the second wireless device into a subset of wireless devices, the subset of wireless devices being one of a plurality of subsets of wireless devices, wherein the classification is based on a type of the second wireless device and a multi-user uplink capability of the second wireless device.

DETAILED DESCRIPTION

Figure 1:
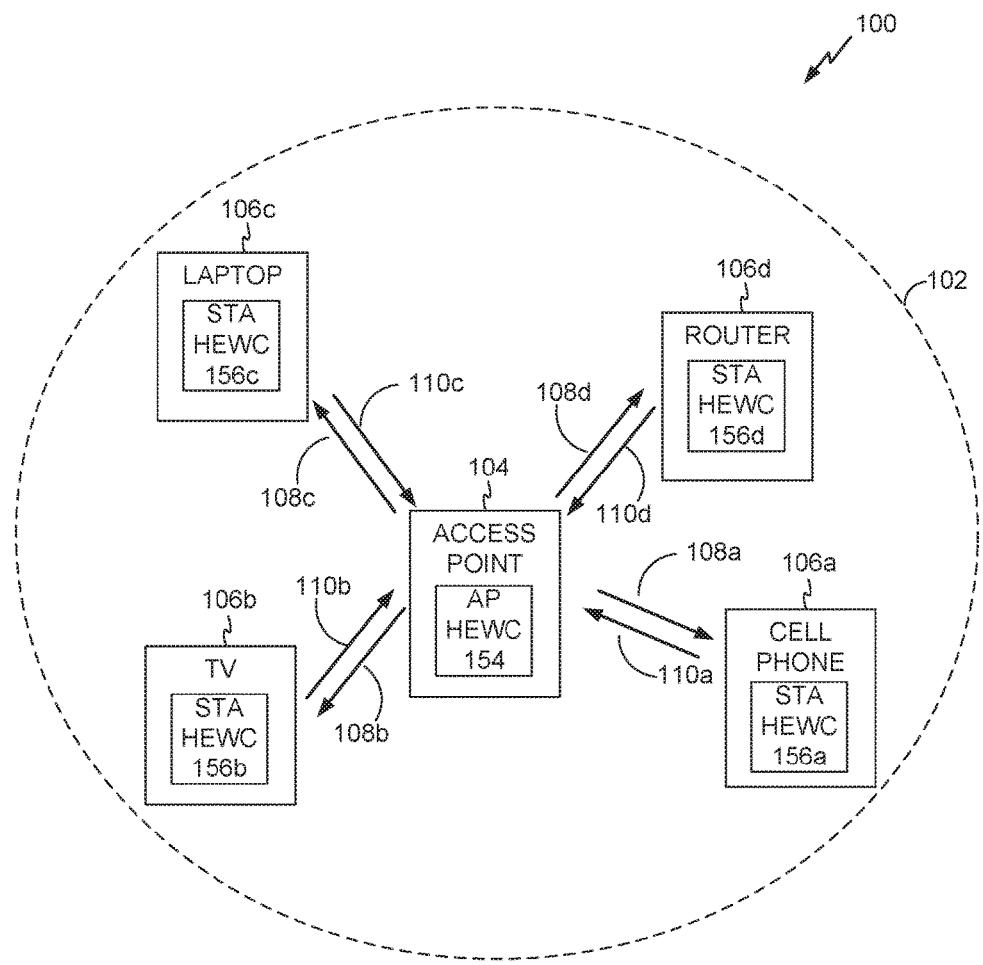
FIG. 1 illustrates an example of a wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN can be used to interconnect nearby devices together, employing widely used networking protocols. The various aspects described herein may apply to any communication standard, such as a wireless protocol.

In some aspects, wireless signals can be transmitted according to a high-efficiency 802.11 protocol using orthogonal frequency-division multiplexing (OFDM), direct-sequence spread spectrum (DSSS) communications, a combination of OFDM and DSSS communications, or other schemes. In some aspects, the high-efficiency 802.11 protocol may comprise the IEEE 802.11ax protocol or future protocols. Implementations of the high-efficiency 802.11 protocol can be used for Internet access, sensors, metering, smart grid networks, or other wireless applications. Advantageously, aspects of certain devices implementing the high-efficiency 802.11 protocol using the techniques disclosed herein may include allowing for increased peer-to-peer services (for example, Miracast, WiFi Direct Services, Social WiFi, etc.) in the same area, supporting increased per-user minimum throughput requirements, supporting more users, providing improved outdoor coverage and robustness, and/or consuming less power than devices implementing other wireless protocols.

In some implementations, a WLAN includes various devices which are the components that access the wireless network. For example, there can be two types of devices: access points ("APs") and clients (also referred to as stations, or "STAs"). In general, an AP may serve as a hub or base station for the WLAN and an STA serves as a user of the WLAN. For example, an STA can be a laptop computer, a personal digital assistant (PDA), a mobile phone, etc. In an example, an STA connects to an AP via a WiFi (for example, IEEE 802.11 protocol) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (for example, a cellular phone or smartphone), a computer (for example, a laptop), a portable communication device, a headset, a portable computing device (for example, a personal data assistant), an entertainment device (for example, a music or video device, or a satellite radio), a gaming device or system, a global positioning system device, or any other suitable device that is configured to communicate via a wireless medium.

As discussed above, certain of the devices described herein may implement a high-efficiency 802.11 standard, for example. Such devices, whether used as an STA or AP or other device, can be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (for example, for use with hotspots), or to implement machine-to-machine communications.

FIG. 1 shows an exemplary wireless communication system 100 in which aspects of the present disclosure can be employed. The wireless communication system 100 may operate pursuant to a wireless standard, for example a high-efficiency 802.11 standard. The wireless communication system 100 may include an AP 104, which communicates with STAs 106a-d.

A variety of processes and methods can be used for transmissions in the wireless communication system 100 between the AP 104 and the STAs 106. For example, signals can be sent and received between the AP 104 and the STAs 106 in accordance with OFDM/OFDMA or multi-user multiple input multiple output (MU-MIMO) techniques. If this is the case, the wireless communication system 100 can be referred to as an OFDM/OFDMA or an MU-MIMO system. Alternatively, signals can be sent and received between the AP 104 and the STAs 106 in accordance with code division multiple access (CDMA) techniques. If this is the case, the wireless communication system 100 can be referred to as a CDMA system.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication can be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

In some aspects, a STA 106 can be required to associate with the AP 104 in order to send communications to and/or receive communications from the AP 104. In one aspect, information for associating is included in a broadcast by the AP 104. To receive such a broadcast, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

In an embodiment, the AP 104 includes an AP high-efficiency wireless component (HEWC) 154. The AP HEWC 154 may perform some or all of the operations described herein to enable communications between the AP 104 and the STAs 106 using the high-efficiency 802.11 protocol. The functionality of some implementations of the AP HEWC 154 is described in greater detail below with respect to FIGS. 2, 3, and 4.

Alternatively or in addition, the STAs 106 may include a STA HEWC 156. The STA HEWC 156 may perform some or all of the operations described herein to enable communications between the STAs 106 and the AP 104 using the high-efficiency 802.11 protocol.

Generally, wireless networks that use a regular 802.11 protocol (for example, 802.11ax, 802.11ah, 802.11ac, 802.11a, 802.11b, 802.11g, 802.11n, etc.) operate under a carrier sense multiple access (CSMA) mechanism for medium access. According to CSMA, devices sense the medium and only transmit when the medium is sensed to be idle. Thus, if the AP 104 and/or STAs 106a-d are operating according to the CSMA mechanism and a device in the BSA 102 (for example, the AP 104) is transmitting data, then in some aspects APs and/or STAs outside of the BSA 102 may not transmit over the medium even though they are part of a different BSA.

The use of the CSMA mechanism then creates inefficiencies because some APs or STAs outside of a BSA can be able to transmit data without interfering with a transmission made by an AP or STA in the BSA. As the number of active wireless devices continues to grow, the inefficiencies can begin to significantly affect network latency and throughput. For example, significant network latency issues may appear in apartment buildings, in which each apartment unit may include an access point and associated stations. In fact, each apartment unit may include multiple access points, as a resident may own a wireless router, a video game console with wireless media center capabilities, a television with wireless media center capabilities, a cell phone that can act like a personal hot-spot, and/or the like. Correcting the inefficiencies of the CSMA mechanism may then be vital to avoid latency and throughput issues and overall user dissatisfaction.

Such latency and throughput issues may not be confined to residential areas. For example, multiple access points can be located in airports, subway stations, and/or other densely-populated public spaces. Currently, WiFi access can be offered in these public spaces, but for a fee. If the inefficiencies created by the CSMA mechanism are not corrected, then operators of the wireless networks may lose customers as the fees and lower quality of service begin to outweigh any benefits.

Accordingly, the high-efficiency 802.11 protocol described herein may allow for devices to operate under a modified mechanism that minimizes these inefficiencies and increases network throughput. Such a mechanism is described below with respect to FIGS. 3-5. Additional aspects of the high-efficiency 802.11 protocol are described below with respect to FIGS. 3-5.

Figure 2:
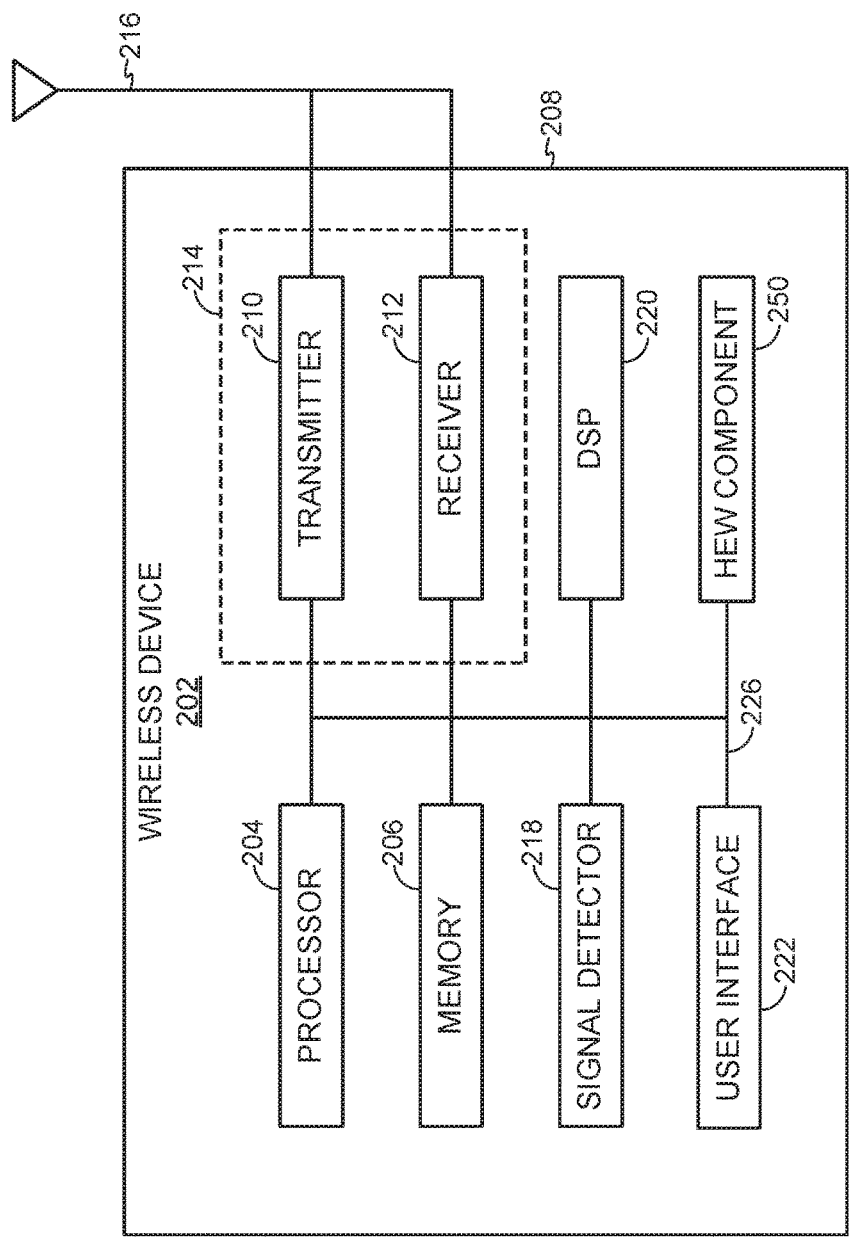
FIG. 2 illustrates various components that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement various aspects described herein. For example, the wireless device 202 may comprise the AP 104 or any one of the wireless devices 106a-106d.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include non-transitory machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas, which may be utilized during MIMO communications, for example.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer convergence procedure (PLCP) protocol data unit (PPDU). In some aspects, the PPDU is referred to as a packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The wireless devices 202 may further comprise a high-efficiency wireless (HEW) component 250 in some aspects. The HEW component 250 may comprise the AP HEWC 154 and/or the STA HEWC 156. As described herein, the HEW component 250 may enable APs and/or STAs to use a modified mechanism that minimizes the inefficiencies of the CSMA mechanism (for example, enables concurrent communications over the medium in situations in which interference would not occur). In some aspects, the AP HEWC 154 may select an EDCA parameter based on the type of STA and/or based on the UL-MU capabilities of the STA. For example, the AP HEWC 154 may a select one or more EDCA parameters for a first subset of STAs of a plurality of STAs that are capable of transmitting UL-MU transmissions (e.g., STAs operating under the 802.11ax standard) and may select a different set of one or more EDCA parameters for a second subset of STAs of a plurality of STAs that are not capable of transmitting UL-MU transmissions (e.g., STAs operating under the 802.11ac or earlier standard). In some embodiments, the first subset and second subset may comprise one or more STAs.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

In a wireless network, channel access parameters can be defined to control access to a transmission medium (e.g., a wireless network) by devices communicating via the wireless network. A transmission medium can also be termed as a transmission channel. Examples of channel access parameters can include (but are not limited to) parameters described as part of the enhanced distributed channel access (EDCA) parameters in the 802.11 industry standard (e.g., 802.11ax). Further examples of channel access parameters can include (but are not limited to) minimum contention window (CWmin), maximum contention window (CWmax), transmit opportunity (TXOP), transmission opportunity limit (TXOP limit), and arbitration inter frame space (AIFS), which may also be part of the EDCA parameters.

Certain aspects of the present disclosure support transmitting an uplink (UL) signal or packet 110 from multiple STAs 106 to the AP 104 or other device. In some embodiments, the UL signal 110 may be transmitted using multi-user MIMO (MU-MIMO). In some embodiments, the UL signal 110 may be transmitted UL-OFDMA. Alternatively, the UL signal 110 may be transmitted in a multi-carrier FDMA (MC-FDMA) or similar FDMA system (e.g., OFDMA). In some aspects, the MU-MIMO/OFDMA and MC-FDMA transmissions comprise concurrent UL transmissions from multiple STAs 106 to the AP 104 may be referred to as more generally, UL-MU communications or transmissions. In some embodiments, the AP 104 may define EDCA parameters to facilitate UL-MU transmissions. The EDCA parameters may be selected and transmitted from the AP 104 during association/re-association (e.g., as data in an association/re-association response message) or included in a beacon frame. In other aspects, the AP 104 may choose to select the EDCA parameters for MU transmissions, and not notify the STAs. In one embodiment the EDCA parameters may be defined in an IEEE 802.11 standard (e.g., 802.11ax). In another embodiment, the EDCA parameter may be enhanced from that defined in an IEEE 802.11 standard by appending one or more rules for an AP 104, a subset of STAs 106, or a type of STAs 106.

The number of wireless devices 202 within the wireless communication system 100 and contending for the same wireless medium can impact the performance of the CSMA mechanism. As the number of devices operating within the network increases, the CSMA mechanism may not be able to adequately support transmissions for a dense network. In some aspects, UL-MU-MIMO or UL-OFDMA transmissions sent simultaneously from multiple STAs 106 to the AP 104 may create efficiencies in wireless communication. However, in some aspects, UL-MU-MIMO or UL-OFDMA transmissions may also contend with CSMA based UL single user (SU) transmissions. When there are a large number of UL-SU transmissions or accesses of the medium, the AP 104 will need to compete against multiple UL-SU transmissions, which could lead to potential unfairness, decreased throughput, reduced access (and starvation in some cases) to UL-MU transmissions. For example, referring to FIG. 1, in some aspects, STAs 106a and 106b may transmit UL-SU signals 110a and 110b and STAs 106c and 106d may transmit UL-MU signals 110c and 110d. Each of the STAs 106a-d contends for channel access to transmit UL signals 110a-d. Such contention may be based on an EDCA parameter and/or an EDCA protocol as specified in an IEEE 802.11 standard (e.g., 802.11ah, or 802.11ac). In some embodiments, the UL-MU signals 110c and 110d (e.g., UL-MU-MIMO or UL-OFDMA transmissions) may be based on a UL-MU trigger frame sent by the AP 104 to the STAs 106c and 106d.

In some aspects, the STAs 106c and 106d may be unable to transmit the high efficiency (HE) UL-MU signals 110c and 110d for an extended period of time when the AP 104 cannot access the channel/medium due to the UL-SU signals 110a and 110b. Also, it may be unfair for STAs that are not capable of transmitting UL-MU transmissions (e.g., legacy STAs) if the same EDCA parameters are used for both STAs capable and not capable of transmitting UL-MU transmissions, since only the STAs capable of transmitting UL-MU transmissions (e.g., scheduled mode STAs) benefit from UL-MU transmissions.

In some embodiments, the AP 104 may limit UL SU transmission by adjusting EDCA parameters for STAs capable of and willing for transmitting UL MU transmissions. The AP 104 may classify the STAs based on their ability to receive and/or transmit scheduled uplink transmissions, or UL MU transmissions. For example, the AP 104 may classify an STA 106 whose UL frames can be both triggered by the AP 104 (e.g., via MU-MIMO, UL OFDMA or other UL-MU transmission) and sent in legacy way into one subset, while classifying an STA 106 whose UL frames can only be sent in a legacy way, into a second subset. However, problems may still exist because the adjusted EDCA parameters broadcasted in existing EDCA parameter set IE in a beacon may affect STAs not capable of or not willing for transmitting UL MU transmissions, since they cannot identify that the carried EDCA parameters are not intended for them. In some aspects, a STA 106 whose UL frames can be both triggered by the AP 104 (e.g., via MU-MIMO, UL OFDMA or other UL-MU transmission) and sent in legacy way (e.g., UL SU frames based on CSMA) may be referred to as a scheduled mode STA. STAs 106 whose UL frames can only be sent in SU CSMA based transmissions may be referred to as legacy mode STAs. For example, legacy mode STAs may operate in non-high throughput (HT), HT, very high throughput (VHT) modes, which do not support triggered (e.g., MU) UL transmissions such as those defined in the 802.11ax standard. In some aspects, 802.11ax STAs can operate in scheduled mode or legacy mode depending on their capability and/or willingness. In some aspects, non-802.11ax STAs can operate only in legacy mode. In some aspects, the AP 104 may select the EDCA based on whether the AP 104 is capable of receiving scheduled uplink transmissions, or UL MU transmissions, from the STAs 106.

Embodiments described herein relate to selecting a different EDCA protocol and/or parameters for a first subset of STAs (e.g., scheduled mode STAs) than for a second subset of STAs (e.g., legacy mode STAs). In some aspects, the different EDCA protocol and/or parameter may comprise setting shorter transmission opportunity (TXOP) limits and/or a larger minimum contention window (CWmin) for scheduled mode STAs than those set for legacy mode STAs. Embodiments described herein also relate to options for signaling EDCA parameters for the first subset of STAs (e.g., scheduled mode STAs) vs. the second subset of STAs (e.g., legacy mode STAs).

In some embodiments, the AP 104 may advertise the EDCA parameter (e.g., CW) for the first subset of STAs (e.g., scheduled mode STAs) in a variety of ways. In some aspects, the AP 104 may transmit an information element (IE), different from an existing EDCA parameter set IE to carry scheduled mode EDCA parameters.

Figure 3:
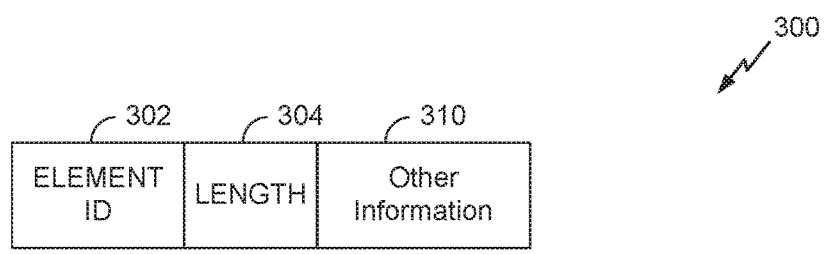
FIG. 3 illustrates an exemplary implementation of an information element.

FIG. 3 illustrates an exemplary implementation of an information element (IE) 300 that may be employed within the wireless communication system 100 of FIG. 1. In various embodiments, any device described herein, or another compatible device, may transmit the information element 300 such as, for example, the AP 104 (FIG. 1), a STA 106a-106d (FIG. 1), and/or the wireless device 202 (FIG. 2). One or more messages in the wireless communication system 100 may include the information element 300 such as, for example, downlink communication 108 and uplink communication 110.

In the illustrated embodiment, the information element 300 includes an element identification (ID) field 302, a length field 304, and another information field 310. The information element 300 may include additional fields, and fields may be rearranged, removed, and/or resized.

In some aspects, the element identifier (ID) field 302 identifies a type of element. The element ID field 302 shown may be one octet long. In some implementations, the element identifier field 302 may be two, five, or twelve octets long. In some implementations, the element identifier field 302 may be of variable length, such as varying length from signal to signal, or type of signal, and/or as between service providers and the types of service providers.

In some embodiments, the IE 300 may comprise an IE with a unique value in the element ID field 302 (e.g., an IE different from existing IEs). This newly defined IE may provide the scheduled mode EDCA parameter set to the first subset of STAs (e.g., scheduled mode STAs). In other aspects, the IE 300 may have a non-unique element ID field 302 but may comprise an IE extension field (not shown), and the combination of the element ID field 302 and the IE extension field is unique and the IE 300 can be identified as a newly defined or unique IE for carrying the scheduled mode EDCA parameter set to the first subset of STAs (e.g., scheduled mode STAs). For example, the element ID field 302 may have a value of 255, which can be shared by many IEs, while the IE extension field may have a value of 1. The combination of the 255 value in the element ID field 302 and the value of 1 in the IE extension field may be unique to the IE 300 and indicate a unique IE not previously defined. In some aspects, the IE 300 described above may be referred to as a scheduled mode EDCA parameter set IE.

In other embodiments, the IE 300 may reuse an existing IE other than existing EDCA parameter set IE (e.g., HE operation IE) that includes one or more new fields (not shown) to indicate that the existing IE carries EDCA parameters (e.g., scheduled mode EDCA parameters) for the first subset of STAs (e.g., scheduled mode STAs).

The length field 304 may be used to indicate the length of the information element 300 or the total length of subsequent fields. The length field 304 shown in FIG. 9 may be one octet long. In some implementations, the length field 304 may be two, five, or twelve octets long. In some implementations, the length field 304 may be of variable length, such as varying length from signal to signal, or type of signal, and/or as between service providers and the types of service providers.

The other information field 310 may be used to indicate other information of the information element 300 other than the element ID or length. In some aspects, the size and number of fields included in the other information field 310 may be based on the value of the element ID field 302 and/or the length field 304. For example, the element ID field 302 may indicate a very high throughput (VHT) information element and the other information field 310 may include VHT operation information such as channel width and/or channel center frequency.

In some embodiments, the AP 104 may include the IE 300 in management/action frames, which can be sent in a broadcast/multicast/unicast transmission. In some aspects, the IE 300 described above may be transmitted such that the second subset of STAs (i.e., non-11ax legacy mode STAs) is unable to understand the IE 300 because of the unrecognized unique element ID field 302, unique combination of the element ID field 302 and element ID extension, or one or more fields including the EDCA parameters for the first subset of STAs (e.g., scheduled mode STAs). In some aspects, the first subset of STAs (i.e. scheduled mode STAs) may be able to decode the IE 300 and follow the new EDCA parameters included in the IE 300. In other aspects, the second subset of STAs (i.e. 11ax legacy mode STAs) may decode the IE 300 and determine to ignore the unintended IE 300, and may determine to continue to operate in legacy mode and follow legacy IE EDCA parameters.

Figure 4:
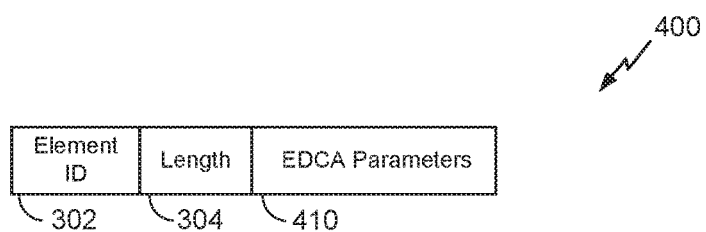
FIG. 4 illustrates another exemplary implementation of an EDCA parameter set information element.

FIG. 4 illustrates an exemplary implementation of an EDCA parameter set information element 400. In some aspects, the AP 104 may transmit the EDCA parameter set element 400 to advertise the EDCA parameter. The EDCA parameter set IE element 400 includes an element identifier (ID) field 302, a length field 304, and an EDCA parameter field 410. In some aspects, the EDCA parameter field 410 indicates an EDCA parameter used for CSMA based SU transmission from scheduled mode STAs. For example, the EDCA parameter field 410 may include an indication of a CW size used for CSMA based SU transmission from scheduled mode STAs.

In some embodiments, the AP 104 may signal scheduled mode EDCA parameters to the first subset of STAs (e.g., scheduled mode STAs) by transmitting the EDCA parameter set IE 400 in a physical layer convergence procedure (PLCP) protocol data unit (PPDU) that is only decodable by the first subset of STAs. For example, the AP 104 may transmit an EDCA IE in an 802.11ax PPDU to carry the scheduled mode EDCA parameters. The 802.11ax PPDUs can be broadcasted/multicasted/unicasted by the AP 104, and cannot be understood/decoded by the second subset of STAs (e.g., legacy mode STAs). The second subset of STAs (e.g., legacy mode STAs) may then ignore the 802.11ax PPDU and only follow EDCA IEs sent in legacy or non-802.11ax PDDUs.

In some aspects, the EDCA parameter set IE 400 included in the 802.11ax PPDU may only carry scheduled mode EDCA parameters. In this embodiment, the EDCA parameters should only be used by the first subset of STAs (e.g., scheduled mode STAs). The second subset of STAs (e.g., legacy mode STAs) should ignore it and only follow existing IE in non-11ax PPDU. In other aspects, the EDCA parameter set IE 400 included in the 802.11ax PPDU may signal either scheduled mode or legacy mode EDCA parameters. In this embodiment, an indicator can be added in the EDCA parameter set IE 400 to indicate if it is for scheduled or legacy mode EDCA, e.g. by using a reserved bit in EDCA parameter set IE 400 (not shown).

In some embodiments, the AP 104 may signal scheduled mode EDCA parameters to the first subset of STAs (e.g., scheduled mode STAs) by transmitting the EDCA parameter set IE 400 in a physical layer convergence procedure (PLCP) protocol data unit (PPDU) that is decodable by both the first subset of STAs (scheduled mode STAs) and the second subset of STAs (e.g., legacy mode STAs). For example, the AP 104 may transmit an EDCA IE in an 802.11ac (or older) PPDU to carry the scheduled mode EDCA parameters. In these implementations, the AP 104 may multicast or unicast the EDCA parameter set IE 400 carrying scheduled mode EDCA parameters only to the first subset of STAs (e.g., scheduled mode STAs). The second subset of STAs (e.g., legacy mode STAs) will not receive the PPDU including the EDCA parameter set IE 400 due to the recipient address. In some aspects, the frame types that are available to unicast or multicast the EDCA parameter set IE 400 may be defined in an 802.11 standard (e.g., 802.11ax).

In some aspects, the AP 104 may also broadcast the EDCA parameter set IE 400 carrying EDCA parameters for the second subset of STAs (e.g., legacy mode EDCA parameters). In these implementations, it may be desirable for certain methods to prevent EDCA parameters for the first subset of STAs (e.g., scheduled mode STAs) from being overwritten by the legacy mode EDCA parameters included in the EDCA parameter set IE 400. In some aspects, the first subset of STAs (e.g., scheduled mode STAs) may pre-programmed to know that broadcasted EDCA is only for legacy mode STAs (e.g., predefined in the 802.11 standard), and should be ignored by scheduled mode STAs. In other aspects, an indicator may be added in the broadcasted EDCA parameter set IE 400 to tell first subset of STAs (e.g., scheduled mode STAs) if they should ignore the EDCA parameter set IE 400 or not. For example, the indicator may comprise one or more reserved bits (not shown) in the EDCA parameter set IE 400.

In some embodiments, a STA 106 may derive scheduled mode EDCA parameters based on legacy mode EDCA parameters. For example, a scheduled mode EDCA parameter (e.g., CWmin) may be a defined offset from the value of the EDCA parameter (CWmin) in legacy mode. In some aspects, the derivation from legacy to scheduled mode EDCA can be based on a default relation defined in 802.11 standards. In some aspects, the AP 104 may send out an updated relation, such as in a beacon message.

In some embodiments, the AP 104 may broadcast the EDCA parameter set IE 400 with encryption to carry EDCA parameters (e.g., scheduled mode EDCA parameters) for the first subset of STAs (e.g., scheduled mode STAs). The broadcasted EDCA parameter set IE 400 information is encrypted and can be carried in non-802.11ax PPDUs. In some aspects, the AP 104 may only provide the encryption key to the first subset of STAs (e.g., scheduled mode STAs) which can then decrypt the EDCA parameter set IE 400, while the second subset of STAs (e.g., legacy mode STAs) cannot.

In some embodiments, the AP 104 may send the EDCA parameter set IE 400 in dedicated resources to carry scheduled mode EDCA parameters. For example, the AP 104 may send the EDCA parameter set IE 400 in dedicated resources (e.g., time/frequency/spatial streams), which can only be received by the first subset of STAs (e.g., scheduled mode STAs). In one aspect, the AP 104 may reserve a frequency channel outside of a non-802.11ax STA operating frequency range, and sends the EDCA parameter set IE 400 carrying scheduled mode EDCA parameters. The first subset of STAs (e.g., scheduled mode STAs) may then tune to the reserved channel to receive the scheduled mode EDCA parameters.

In other embodiments, default EDCA parameters can be standardized for the first subset of STAs (e.g., scheduled mode STAs). In some aspects, the scheduled mode STAs will use these default EDCA parameters if they do not receive any EDCA parameters intended for them based on any rule. In some aspects, the default scheduled mode EDCA parameters could be defined as those for the background access class (AC) for legacy mode EDCA parameters.

In some embodiments, the EDCA parameter set IE 400 may carry an indicator forbidding CSMA based SU UL transmissions. In some aspects, the indicator can be a reserved EDCA parameter value (e.g., CWmin=1023 means forbidding CSMA based SU UL Tx for corresponding access category (AC)). In some aspects, the indicator can use new bit(s) in additional to signaled EDCA parameters. In other aspects, the indicator may also specify additional conditions for it to be applied (e.g., forbiddance is only applied to certain traffic identifiers (TIDs), access categories (ACs), info types (e.g. buffer status report), frame types (e.g. control frames), operation modes (e.g. SU UL MIMO Tx), STA states (e.g. unassociated or associated)).

In some aspects, the AP 104 may decide to use the EDCA parameter set IE 400 for both legacy and scheduled mode STAs, even if a new IE can be defined and used to signal scheduled mode EDCA as described above with respect to FIG. 3. For example, in order to save signaling overhead, the AP 104 may decide to use same EDCA parameters for both groups of STAs (e.g., both scheduled and legacy mode STA types) when the system 100 is lightly loaded. In this case, an indicator can be added in the EDCA parameter set IE 400 to tell scheduled mode STAs if they should ignore the EDCA parameter set IE 400 or not. For example, the indicator may comprise a reserve bit in the EDCA parameter set IE 400 (not shown). Alternatively, a predefined rule can be used in the 802.11 to tell scheduled mode STAs to use the EDCA parameter set IE 400 if only the EDCA parameter set IE 400 presents in certain frame types (e.g., beacons, probe/association response). If decoding a unique IE with EDCA parameters for the first group (e.g., IE 300) in those frame types, the first subset of STAs (e.g., scheduled mode STAs) should update their EDCA parameters based on EDCA parameters for the first group.

Embodiments described herein also relate to selecting whether a STA 106 should operate in either scheduled or legacy mode. Generally, the first subset of STAs (e.g., scheduled mode STAs) should use scheduled mode EDCA parameters if they are capable of being scheduled by the AP 104 for UL transmission (e.g., UL-MU capable). In some aspects, an EDCA selection decision maker (DM) could be the STA 106 or AP 104, which will decide if the STA 106 should use scheduled or legacy mode EDCA parameters.

The DM may decide to use scheduled mode EDCA parameters for the STA 106 based on a number of criterion options. For example, the DM may make its determination based on the capabilities of the STA 106. In these aspects, the DM decides to use scheduled mode EDCA parameters if both the AP 104 and STA 106 have the capability to perform certain types of scheduled UL transmission, e.g. UL MU-MIMO, UL OFDMA. In some aspects, the STA 106 can know the AP 104 capability based on info in the AP 104's broadcast or probe/association responses. In some aspects, the AP 104 can know the STA 106's capability based on info in the STA 106's probe/association requests.

In other embodiments, the DM may make its determination based on whether legacy mode transmission results satisfy a performance characteristic. For example, the DM decides to use scheduled mode EDCA parameters if the STA 106's legacy mode transmissions have had poor performance. In one example, if the STA 106 is sending less than X frames in Y sec, the STA 106 using legacy mode EDCA may switch to scheduled mode EDCA and terminate backoff for legacy mode transmissions.

In some embodiments, the DM may make its determination based whether on scheduled mode transmission results satisfy a performance characteristic. In some aspects, the DM decides to use scheduled mode EDCA parameters only after successful scheduled UL transmissions (e.g., DL ACK is sent or received for the corresponding scheduled UL transmission). This process may verify that both sides indeed have the scheduled mode capability. In some aspects, the STA 106 may use legacy mode EDCA parameters prior to a successful scheduled mode transmission.

If the STA 106 is the DM, it may inform the AP 104 of its EDCA selection decision in a number of ways. In some aspects, the STA 106 may use implicit signaling. For example, a rule may be defined in the standard such that both the AP 104 and the STA 106 will run the same EDCA selection criterion. In this implementation, the AP 104 will know the STA 106's decision without being informed by the STA 106. In some aspects, the 802.11 standard defines a rule that the STA 106 should use scheduled mode EDCA parameters if both the AP 104 and the STA 106 support scheduled mode UL transmissions. Therefore, the AP 104 may implicitly know STA 106's decision by checking the STA 106's capability without additional signaling. In some aspects, the EDCA selection criterion may be standardized or broadcasted by the AP 104 if there are multiple options, so both the AP 104 and the STA 106 will use same criterion.

In some embodiments, the STA 106 may use explicit signaling to inform the AP 104 of its EDCA selection decision. For example, the STA 106 may send an indicator to explicitly inform the AP 104 the STA 106's EDCA selection decision. In one aspect, the indicator may comprise a 1-bit indicator in an existing Receiver Operation Mode Indicator (ROMI) HE control field, in a defined EDCA Operation HE control field, in an uplink multi-user disable field in an Operation Mode Indicator (OMI) A-control field included in a frame sent to the access point, or in certain management frames, e.g., a probe/association request. In some aspects, the indicator can be the STA 106's buffer status report, implying it wants to use scheduled mode EDCA parameters. In other aspects, the indicator may also specify additional conditions to use the selected EDCA parameters (e.g., only use for certain TIDs, info types (e.g. buffer status report), frame types (e.g. control frames), operation modes (e.g. SU UL MIMO Tx), STA states (e.g. unassociated or associated)). In some aspects, after receiving the indicator, the AP 104 may approve/reject/revise the EDCA selection decision and/or additional conditions.

If the AP 104 is the DM, it may inform the STA 106 of its EDCA selection decision in a number of ways. In some aspects, the AP 104 may use implicit signaling to inform the STA 106. For example, the AP 104 may only send the STA 106 the EDCA IE designated for the first subset of STAs (e.g., scheduled mode STAs) or the second subset of STAs (e.g., legacy mode STAs) in certain frame types (e.g., not send both). In some aspects, the AP 104 may only send the EDCA IE for scheduled mode STAs in probe/association responses or action frames to implicitly inform the STA 106 to use scheduled mode EDCA parameters.

In some embodiments, the AP 104 may use explicit signaling to inform the STA 106 of its EDCA selection decision. For example, the AP 104 sends an indicator to explicitly inform the STA 106 of the AP 104 EDCA selection decision. In some aspects, the indicator comprises a 1-bit indicator in a potential EDCA configuration HE control field. In other aspects, the indicator may also specify additional conditions to use the selected EDCA parameters, (e.g., only use for certain TIDs, info types (e.g. buffer status report), frame types (e.g. control frames), operation modes (e.g. SU UL MIMO Tx), STA states (e.g. unassociated or associated)). After receiving the indicator, the STA 106 may approve/reject/revise the EDCA selection decision and/or additional conditions.

Additionally, embodiments described herein also relate to options allowing the first subset of STAs (e.g., scheduled mode STAs) to transition from operating in scheduled mode to operating in legacy mode. In some aspects, a scheduled mode STA 106 may revert back to legacy mode EDCA parameters if selecting scheduled mode EDCA parameters gives poor performance. In these aspects, the fallback to legacy mode may then provide better performance for the scheduled mode STA 106 and increase throughput. In some aspects, poor performance can be determined by determining that the STA 106 (with buffered data) is not scheduled for UL transmission after "X" seconds. For example, if the AP 104 does not receive an immediate response from the STA 106 to the indicator informing the STA 106 of the AP 104 EDCA selection decision, then the AP 104 may change the previously selected EDCA parameter, or select a second EDCA parameter. In either case, the AP 104 may send an indicator to explicitly inform the STA 106 of the AP 104 subsequent EDCA selection decision. In some aspects the immediate response may refer to a window of time lasting "X" seconds. In another example, a second EDCA parameter may be selected based on a time elapsed since receiving the immediate response from the STA 106 in response to the indication transmitted to the STA 106 from the AP 104. In some aspects, poor performance can be determined by determining that the STA's 106 non-scheduled transmission fails for "Y" attempts. For example, the AP 104 may change the previously selected EDCA parameter, or select a second EDCA parameter, based on a previous transmission that fails from the second wireless device to the first wireless device. In some aspects, poor performance can be determined by determining that the STA 106 is not scheduled after sending the indicator, or UL scheduling request, e.g., buffer status report, for "Z" times, where "Z" may refer to a number of times the indicator is sent. For example, if the AP 104 transmits the indicator to the STA 106 "Z" times, and the STA 106 does not provide a response, then the AP 104 may select a new EDCA or change the current EDCA.

In some aspects, the values of X, Y, and Z described above may be determined in a number of ways. In some aspects, the values of X, Y, and Z may be defined in standards (e.g., 802.11 standards). In some aspects, the values of X, Y, and Z are determined by the AP 104 and sent by the AP 104 to the STA 106. The AP 104 may determine X/Y/Z based on estimated scheduling latency for intended STAs 106, e.g. X may increase for higher load. In some aspects, the AP 104 may broadcast/multicast/unicast X/Y/Z to intended STAs 106. In some aspects, the values of X, Y, and Z are determined by the STA 106. In some embodiments, the STA 106 may determine and update X/Y/Z based on latency requirement of its traffics. In some aspects, the STA 106 may piggyback X/Y/Z onto its frames, e.g., buffer status report. In some aspects, the values of X, Y, and Z are determined based on negotiation between the AP 104 and the STA 106. For example, one side can send suggested X/Y/Z to the other, which can further accept/reject/revise it.

In some embodiments, the first subset of STAs (e.g., scheduled mode STAs) can have a timer/counter to count X/Y/Z. In some aspects, the STA 106 may reset timer/counter to zero based on one or more conditions. For example, the STA 106 may reset timer/counter to zero after the STA 106 knows to use scheduled mode EDCA (e.g., decision made by the AP 104 or the STA 106). In other aspects, the STA 106 may reset timer/counter to zero after the STA 106 wakes up. In other aspects, the STA 106 may reset timer/counter to zero after the STA 106 receives trigger frame scheduling for its UL transmission. In other aspects, the STA 106 may reset timer/counter to zero after the STA 106 trigger frame scheduling for any UL transmission. The trigger frame could be a trigger frame that triggers UL OFDMA random access. In other aspects, the STA 106 may reset timer/counter to zero after the STA 106 transmits a scheduled UL transmission, or transmits a scheduled UL transmission and gets an ACK message. In other aspects, the STA 106 may reset timer/counter to zero after the STA 106 transmits a non-scheduled UL transmission, or transmits a non-scheduled UL transmission and gets an ACK message. In addition, the AP 104 may send a "fallback forbiddance" indicator to forbid fallback to legacy mode EDCA. The AP 104 may broadcast/multicast/unicast this indicator to intended STAs 106. The STAs 106 receiving the indicator may not revert back to legacy mode EDCA parameters after receiving this indicator.

In some embodiments, fallback to legacy mode EDCA may be restricted to certain traffics. For example, the STA 106 may use legacy mode EDCA for some traffics and other traffics may still use scheduled mode EDCA. In some aspects, traffic restriction may be only applied to certain traffic/info types, or TIDs. For example, only voice and buffer status report can be sent in legacy mode EDCA. In some aspects, traffic restriction may be only applied to certain frame types. For example, only control frames can be sent in legacy mode EDCA. In some aspects, traffic restriction may be only applied to TIDs not scheduled for X seconds. In this case, the fallback decision is per TID, and the STA 106 needs a timer per TID to decide if fallback should occur for each TID.

Figure 5:
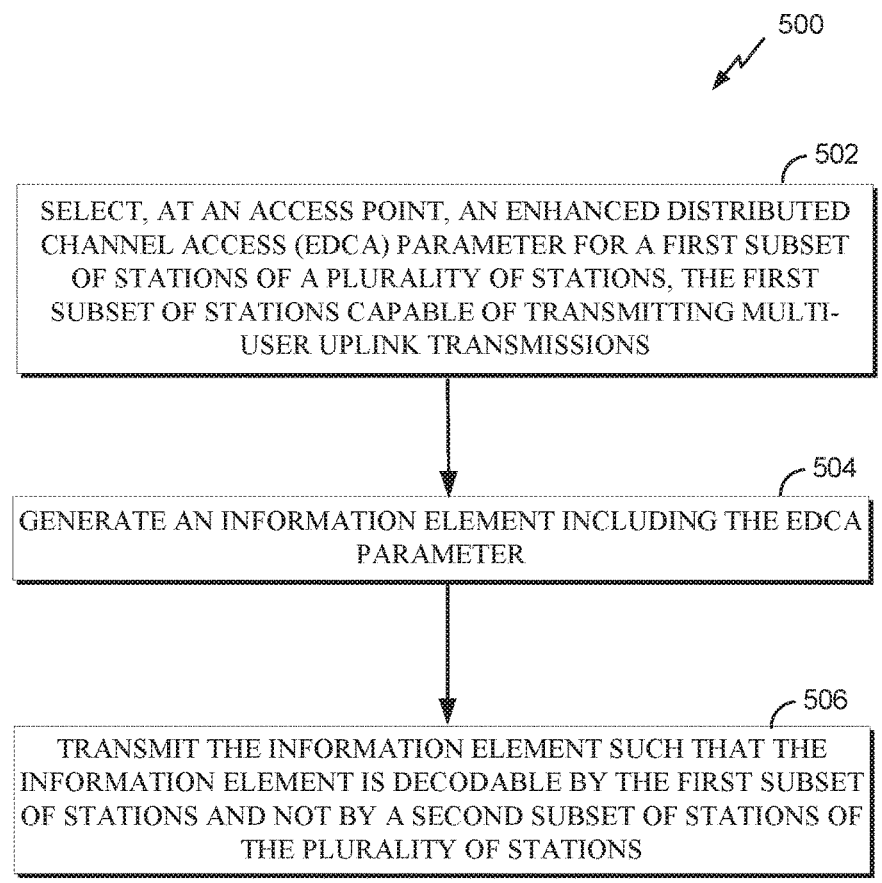
FIG. 5 shows a flow chart of an exemplary method of wireless communication in a wireless communication system.

FIG. 5 shows a flow chart of an implementation of a method 500 of wireless communication in a wireless communication system. The method 500 may be used to generate and/or transmit any of the EDCA parameters, the information element 300, or EDCA parameter set IE 400 described in connection with FIGS. 3-4. In some aspects, the EDCA parameters, the information element 300, or EDCA parameter set IE 400 may be transmitted by the AP 104. In addition, the wireless device 202 shown in FIG. 2 may represent a more detailed view of the AP 104 or STA 106, as described above. Thus, in one implementation, one or more of the steps in method 500 may be performed by, or in connection with, a processor and/or transmitter, such as the processor 204, transmitter 210, and HEW component 250 of FIG. 2, although those having ordinary skill in the art will appreciate that other components may be used to implement one or more of the steps described herein. Although the method steps may be described as occurring in a certain order, the steps can be reordered, omitted, and/or additional steps may be added.

At block 502, the method 500 may include selecting, at an access point, an enhanced distributed channel access (EDCA) parameter for a first subset of stations of a plurality of stations, the first subset of stations capable of transmitting multi-user uplink transmissions. Such selecting may be performed by the processor 204 or the HEW component 250 of the wireless device 202 shown in FIG. 2. At block 504, the method 500 may include generating an information element including the EDCA parameter. For example, the AP 104 may generate the information element 300 or the EDCA parameter set IE 400. Such generating may be performed by the processor 204 or the HEW component 250 of the wireless device 202 shown in FIG. 2. At block 506, the method 500 may include transmitting the information element such that the information element is decodable by the first subset of stations and not by a second subset of stations of the plurality of stations. Such transmitting may be performed by the transmitter 210 of the wireless device 202 shown in FIG. 2.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for selecting channel access parameters for communication in a network, the method comprising:
   selecting, at a first wireless device, a first enhanced distributed channel access (EDCA) parameter for communication by a first subset of wireless devices that do not have the capability to transmit multi-user uplink transmissions, the first EDCA parameter comprising at least one of a first minimum contention window (CWmin), a first maximum contention window (CWmax), a first transmission opportunity limit (TXOP limit), or a first arbitration inter frame space (AIFS);
   selecting, at the first wireless device, a second EDCA parameter for communication by a second subset of wireless devices, the second EDCA parameter comprising at least one of a second CWmin different than the first CWmin, a second CWmax different than the first CWmax, a second TXOP limit different than the first TXOP limit, or a second AIFS different than the first AIFS, wherein selecting the second EDCA parameter is based on:
      a capability of the first wireless device to receive scheduled uplink transmissions, and
      a capability of the second subset of wireless devices to transmit multi-user uplink transmissions; and
   outputting, for transmission to the second subset of wireless devices, a message that indicates the second EDCA parameter, wherein the message is only addressed to the second subset of wireless devices, and wherein the message is not decodable by the first subset of wireless devices.

2. The method of claim 1, wherein the first wireless device is an access point, and wherein the first subset of wireless devices and the second subset of wireless devices are stations.

3. The method of claim 1, further comprising:
   determining whether the second EDCA parameter satisfies a performance characteristic, and
   in response to determining that the second EDCA fails to satisfy the performance characteristic, selecting a third EDCA parameter.

4. The method of claim 3, wherein selecting the third EDCA parameter is based on a previous transmission from a second wireless device of the second subset of wireless devices to the first wireless device.

5. The method of claim 3, wherein selecting the third EDCA parameter is based on receiving an immediate response to the message transmitted to the second subset of wireless devices.

6. The method of claim 3, wherein selecting the third EDCA parameter is based on failure to receive a response from a second wireless device of the second subset of wireless devices after transmitting an indication of the selection of the second EDCA parameter to the second subset of wireless devices a number of times.

7. The method of claim 1, further comprising generating an information element for inclusion in the message, the information element comprising a variable length of bits, wherein the variable length of bits is based on at least one of a type of signal and a service provider.

8. The method of claim 1, wherein selecting the second EDCA parameter further comprises selecting the EDCA parameter based on a type of the second subset of wireless devices.

9. The method of claim 1, wherein the first wireless device appends one or more rules for communicating with the first wireless device to the indication of the second EDCA parameter.

10. The method of claim 1, wherein the message includes an information element, wherein the information element includes the indication of the second EDCA parameter and at least one of an element identification field, a length field, another information field, or an extension field.

11. An apparatus for wireless communication, comprising:
a processing system configured to:
select, at a first wireless device, a first enhanced distributed channel access (EDCA) parameter for communication by a first subset of wireless devices that do not have the capability to transmit multi-user uplink transmissions, the first EDCA parameter comprising at least one of a first minimum contention window (CWmin), a first maximum contention window (CWmax), a first transmission opportunity limit (TXOP limit), or a first arbitration inter frame space (AIFS);
select, at the first wireless device, a second EDCA parameter for communication by a second subset of wireless devices, the second EDCA parameter comprising at least one of a second CWmin different than the first CWmin, a second CWmax different than the first CWmax, a second TXOP limit different than the first TXOP limit, or a second AIFS different than the first AIFS, wherein selecting the second EDCA parameter is based on:
a capability of the first wireless device to receive scheduled uplink transmissions, and
a capability of the second subset of wireless devices to transmit multi-user uplink transmissions; and
output, for transmission to the second subset of wireless devices, a message that indicates the second EDCA parameter, wherein the message is only addressed to the second subset of wireless devices, and wherein the message is not decodable by the first subset of wireless devices.

12. The apparatus of claim 11, further comprising a transmitter configured to transmit the message to the second subset of wireless devices.

13. The apparatus of claim 11, wherein selecting the second EDCA parameter comprises selecting the second EDCA parameter based on a type of the second subset of wireless devices.

14. The apparatus of claim 11, wherein the first wireless device appends one or more rules for communicating with the first wireless device to the indication of the second EDCA parameter.

15. The apparatus of claim 11, wherein the message includes an information element, wherein the information element includes the indication of the second EDCA parameter and at least one of an element identification field, a length field, another information field, or an extension field.

16. A non-transitory computer-readable medium comprising code that, when executed, causes an apparatus to:
select a first enhanced distributed channel access (EDCA) parameter for communication by a first subset of wireless devices that do not have the capability to transmit multi-user uplink transmissions, the first EDCA parameter comprising at least one of a first minimum contention window (CWmin), a first maximum contention window (CWmax), a first transmission opportunity limit (TXOP limit), or a first arbitration inter frame space (AIFS);
select a second EDCA parameter for communication by a second subset of wireless devices, the second EDCA parameter comprising at least one of a second CWmin different than the first CWmin, a second CWmax different than the first CWmax, a second TXOP limit different than the first TXOP limit, or a second AIFS different than the first AIFS, wherein selecting the second EDCA parameter is based on:
a capability of the first wireless device to receive scheduled uplink transmissions, and
a capability of the second subset of wireless devices to transmit multi-user uplink transmissions; and
output, for transmission to the second subset of wireless devices, a message that indicates the second EDCA parameter, wherein the message is only addressed to the second subset of wireless devices, and wherein the message is not decodable by the first subset of wireless devices.

17. The non-transitory computer-readable medium of claim 16, wherein the message includes an information element, wherein the information element includes the indication of the second EDCA parameter and at least one of an element identification field, a length field, another information field, and an extension field.

* * * * *